United States Patent
Enomoto

(10) Patent No.: US 10,337,481 B2
(45) Date of Patent: Jul. 2, 2019

(54) START CONTROLLER FOR ENGINE

(71) Applicant: TOYOTA JIDOSHA KABUSHIKI KAISHA, Toyota-shi, Aichi-ken (JP)

(72) Inventor: Hiroshi Enomoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 15/673,875

(22) Filed: Aug. 10, 2017

(65) Prior Publication Data

US 2018/0058409 A1 Mar. 1, 2018

(30) Foreign Application Priority Data

Aug. 25, 2016 (JP) ................. 2016-164917

(51) Int. Cl.
*F02N 11/08* (2006.01)
*F02N 99/00* (2010.01)

(52) U.S. Cl.
CPC ...... *F02N 11/0848* (2013.01); *F02N 11/0855* (2013.01); *F02N 99/004* (2013.01); *F02N 11/0814* (2013.01); *F02N 11/0844* (2013.01); *F02N 99/006* (2013.01); *F02N 2250/04* (2013.01); *F02N 2300/2002* (2013.01); *Y02T 10/48* (2013.01)

(58) Field of Classification Search
CPC ............. F02N 11/0814; F02N 11/0825; F02N 11/0844; F02N 11/0848; F02N 11/0851; F02N 11/0855; F02N 2019/002; F02N 99/002; F02N 99/004; F02N 99/006; F02N 2300/2002; F02D 41/065
See application file for complete search history.

(56) References Cited

U.S. PATENT DOCUMENTS

| 2004/0060530 A1* | 4/2004 | Mitani | F02N 11/08 123/179.3 |
| 2005/0221952 A1* | 10/2005 | Tetsuno | F02N 11/0814 477/115 |
| 2009/0037085 A1* | 2/2009 | Kojima | F02N 11/0844 701/113 |

FOREIGN PATENT DOCUMENTS

| JP | 2005-042564 A | | 2/2005 | |
| JP | 2005-155362 A | | 6/2005 | |
| JP | 2006-105160 A | | 4/2006 | |
| JP | 2006188963 A | * | 7/2006 | ......... F02N 11/0844 |
| JP | 2008101511 A | * | 5/2008 | |

* cited by examiner

*Primary Examiner* — Erick R Solis
*Assistant Examiner* — Anthony L Bacon
(74) *Attorney, Agent, or Firm* — Oliff PLC

(57) ABSTRACT

In the cases where a reverse operation of a crankshaft is performed after fuel injection and ignition in a cylinder in a power stroke and it is determined that an engine start is failed, a starter motor is operated, and fuel injection and ignition are executed in the cylinder in the compression stroke to start an engine.

2 Claims, 6 Drawing Sheets

START CONTROLLER FOR ENGINE

INCORPORATION BY REFERENCE

The disclosure of Japanese Patent Application No. 2016-164917 filed on Aug. 25, 2016 including the specification, drawings and abstract is incorporated herein by reference in its entirety.

BACKGROUND

1. Technical Field

The disclosure relates to a controller that restarts an engine without use of a starter motor when a restart condition is established immediately before an engine stop, and, in particular to, a backup technique for a case where a restart is failed.

2. Description of Related Art

Conventionally, a system (an idling stop system) that automatically stops a vehicular engine during idling and automatically restarts the engine thereafter has generally been known. It has been proposed that, when a restart condition is established immediately before a crankshaft stops rotating during an engine automatic stop, such a system restarts the engine (hereinafter also referred to as an ignition start) without use of a starter motor but by fuel injection and ignition in a cylinder in a power stroke.

In other words, in a process of the engine stop, a rotational speed of the crankshaft is gradually reduced due to mechanical loss and pumping of each of the cylinders. When the restart condition is established in such a state, the fuel injection and the ignition in the cylinder in the power stroke at the time are executed in a cylinder-injection type gasoline engine disclosed in Japanese Patent Application Publication No. 2005-155362 (JP 2005-155362 A), for example. In this way, rotary power is provided to the crankshaft, and the ignition start is thereby performed.

SUMMARY

When the rotational speed of the crankshaft becomes extremely low in the process of the engine stop as described above, an intake air flow in the cylinder also becomes extremely small, which hinders generation of air-fuel mixture from being promoted. Accordingly, a misfire possibly occurs when an ignition plug attempts to ignite the air-fuel mixture. Even when the ignition plug ignites the air-fuel mixture, significant combustion pressure cannot be obtained, and the sufficient rotary power cannot be provided to the crankshaft. As a result, the engine start possibly fails.

When the ignition start fails, just as described, it is considered to switch to a normal start by operating the starter motor for cranking. At this time, the starter motor starts being operated after the crankshaft stops rotating, and the start failure is determined, for example. Thus, a longer time is required for the engine restart, which gives a driver an impression of the slow restart.

In view of the above problem, the disclosure provides a controller that performs an ignition start at a time when a restart condition is satisfied immediately before an engine stop and that promptly determines failure of the ignition start and switches to a starter start when the ignition start fails.

A target of the disclosure is a start controller for a cylinder-injection type engine, the start controller executing fuel injection and ignition in a cylinder in a power stroke and restarting the engine without use of a starter motor when a restart condition is established immediately before a stop of the engine. The start controller includes determination means that determines failure of the start when a reverse operation of a crankshaft is performed after the fuel injection and the ignition in the cylinder in the power stroke. If this determination means determines the failure of the start, the starter motor is operated, and the fuel injection and the ignition are executed in a cylinder in a compression stroke to start the engine.

More specifically, even in the cases where the restart condition is established in a process of an engine stop and the fuel injection and the ignition are executed in the cylinder in the power stroke to attempt an ignition start as described above, sufficient rotary power cannot be provided to the crankshaft, which results in the failure of the start. According to the above configuration, at this time, before rotation of the crankshaft is stopped, the failure of the start is determined on the basis of the reverse operation of the crankshaft after the fuel injection and the ignition for the ignition start.

When the failure of the start is promptly determined just as described, the starter motor immediately start being operated, and the fuel injection and the ignition are sequentially executed in the cylinders in the compression stroke and an intake stroke. That is, the engine start is switched to a normal starter start. In this way, the engine can promptly be restarted. Thus, the driver can be inhibited from receiving impression of the slow restart.

In detail, after the failure of the start occurs as described above, the piston can no longer reach top dead center due to increased cylinder pressure in the compression stroke of the cylinder. As a result, after the crankshaft is momentarily stopped, the reverse operation thereof is performed. Once the reverse operation of the crankshaft, the engine is not started thereafter. For this reason, when the reverse operation (a specified rotational state) of the crankshaft is identified on the basis of a crank signal, the failure of the start can be determined.

Note that, as a method of further promptly determining the failure of the engine start, it is considered to determine the failure of the start on the basis of a reduction in a rotational speed of the crankshaft by a specified value or more after the fuel injection and the ignition. However, because the rotational speed of the crankshaft fluctuates significantly immediately before a stop, it is difficult to set a threshold that is used to determine the failure of the start. When the threshold is set to be small, an erroneous determination of the failure may be made. On the other hand, when the threshold is set to be large, the failure of the start may not be recognized.

In addition, even in the case where the failure of the start is determined on the basis of the reverse operation of the crankshaft as described above, the crank signal is not output when the reverse operation is extremely small. As a result, this reverse operation may not be recognized, that is, the failure of the start may not be recognized. In view of this, similar to the related art, the failure of the start may also be determined when the rotation of the crankshaft is stopped (that is, when the crank signal is not input for a specified time or longer).

As it has been described so far, according to the start controller for the engine of the disclosure, in the cases where the restart condition is established immediately before the engine stop and the engine is restarted by the fuel injection and the ignition in the cylinder in the power stroke (the ignition start), the failure of this ignition start can promptly be determined on the basis of the reverse operation of the crankshaft even when the ignition start fails. Therefore, the engine start is immediately switched to the starter start thereafter. In this way, the driver is less likely to receive the impression of the slow restart.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on an embodiment of the disclosure with reference to the drawings. As one example of this embodiment, a description will be made on a case where the disclosure is applied to a gasoline engine mounted on a vehicle.

Figure 1:
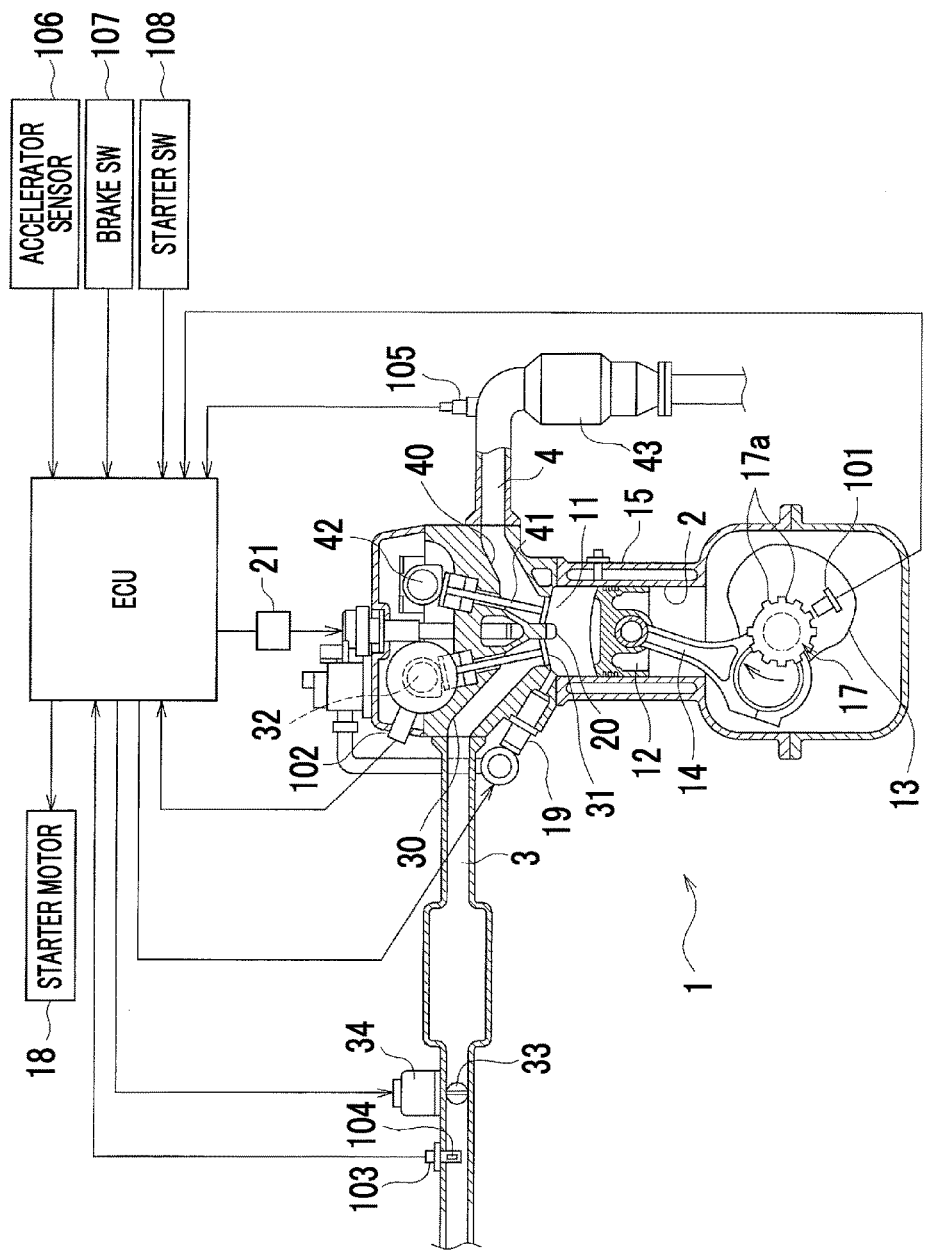
FIG. 1 is a schematic configuration diagram of an engine according to an embodiment.

—Engine Overview—FIG. 1 shows a schematic configuration of an engine 1. The engine 1 of this embodiment is a four-cylinder gasoline engine, and four of first to fourth cylinders 2 (only one is shown in the drawing) each accommodate a piston 12 in a manner to define a combustion chamber 11. The piston 12 and a crankshaft 13 are coupled by a connecting rod 14, and a crank angle sensor 101 that detects a rotation angle (crank angle) of the crankshaft 13 is provided.

More specifically, a signal rotor 17 is attached to the crankshaft 13, and plural teeth 17a are provided on an outer circumferential surface thereof. The crank angle sensor 101 includes two electromagnetic pickups, for example, and each of the electromagnetic pickups outputs a pulse signal every time the tooth 17a of the signal rotor 17 passes the electromagnetic pickup by rotation of the crankshaft 13.

The signal output from one of the two electromagnetic pickups is a crank signal, and the signal output from the other has a specified phase difference from the crank signal. Accordingly, it is possible to determine whether the crankshaft 13 currently makes positive rotation (or is currently in reverse operation), depending on the other signal being high or low at rise time or fall time of the signal from the one electromagnetic pickup (see JP 2005-155362 A and the like, for details).

Although not shown, a flywheel is attached to an end of the crankshaft 13 in a manner to integrally rotate therewith. A starter motor 18 (schematically shown in FIG. 1) is disposed such that a pinion gear thereof meshes with a ring gear on an outer circumference of the flywheel and thereby enables rotation of the starter motor 18. As will be described below, this starter motor 18 receives a signal from an ECU 100 for an operation in at a start of the engine 1.

A cylinder head 16 is placed on top of a cylinder block 15, and an injector 19 is disposed for each of the cylinders 2 and faces the combustion chamber 11. For example, fuel that is injected from the injector 19 in an intake stroke of the cylinder 2 spreads along a flow of intake air in the cylinder 2 and produces air-fuel mixture. An ignition plug 20 is also disposed in the cylinder head 16 to ignite the thus-produced air-fuel mixture, and discharges sparks when receiving an electric power supply from an igniter 21.

Furthermore, the cylinder head 16 is formed with an intake port 30 and an exhaust port 40 in a manner to communicate with the combustion chamber 11 in each of the cylinders 2. Openings of the intake port 30 and the exhaust port 40, which face the inside of the cylinder 2, are respectively opened/closed by an intake valve 31 and an exhaust valve 41. Valve gears that operate these intake valve 31 and exhaust valve 41 include two intake and exhaust camshafts 32, 42, each of which is rotated by the crankshaft 13 via a timing chain and a sprocket, which are not shown.

A cam angle sensor 102 is arranged near the intake camshaft 32, and outputs a pulse signal (hereinafter referred to as a cam signal) when any of the cylinders 2 is located at a specified crank angle position (for example, when the first cylinder 2 is located at top dead center). The intake camshaft 32 rotates at half a speed of the crankshaft 13. Thus, every time the crankshaft 13 makes two rotations (the crank angle is changed by 720°), the cam angle sensor 102 outputs the cam signal at least once.

In an intake passage 3 that communicates with an upstream side of the intake port 30 (an upstream side of an intake air flow), an airflow meter 103, an intake air temperature sensor 104 (built in the airflow meter 103), and an electronically-controlled throttle valve 33 are disposed. This throttle valve 33 is driven by a throttle motor 34 and adjusts an intake air amount of the engine 1 by throttling the intake passage 3 to reduce the intake air flow.

The intake air, the amount of which is adjusted by the throttle valve 33 just as described, flows into each of the cylinders 2 from the intake port 30, is mixed with the fuel injected from the injector 19 as described above, and produces the air-fuel mixture. Thereafter, the air-fuel mixture is ignited by the ignition plug 20 and combusted in a latter half of the compression stroke, and thus-produced gas flows out of the exhaust port 40 in an exhaust stroke of the cylinder 2. In an exhaust passage 4 that communicates with a downstream side of this exhaust port 40 (a downstream side of an exhaust flow), a catalyst 43 is disposed to purify exhaust gas, and an air-fuel ratio sensor 105 is disposed on an upstream side of the catalyst 43.

—ECU—The engine 1, which is configured as described above, is controlled by the ECU 100. The ECU 100 includes a known electronic control unit and, although not shown, includes a central processing unit (CPU), read only memory (ROM), random access memory (RAM), backup RAM, and the like. The CPU executes various types of arithmetic processing on the basis of control programs and maps stored in the ROM. The RAM temporarily stores arithmetic results of the CPU, data received from the sensors, and the like. The backup RAM, for example, stores data that should be stored at a stop of the engine 1, and the like.

In addition to the crank angle sensor 101, the cam angle sensor 102, the airflow meter 103, the intake air temperature sensor 104, and the air-fuel ratio sensor 105 described above, an accelerator sensor 106 that detects an operation amount of an accelerator pedal (accelerator operation amount), a brake switch (brake SW) 107 that detects an operation of a brake pedal, a starter motor switch (starter motor SW) 108 for an operation of the starter motor 18, and the like are connected to the ECU 100.

Based on the signals received from those various sensors and switches 101 to 108, the ECU 100 executes the various control programs to control an operation state of the engine 1. For example, the ECU 100 executes fuel injection control by the injector 19 (control of an injection amount and injection timing), ignition control by the igniter 21 (control of ignition timing by the ignition plug 20), control of a throttle opening degree by the throttle motor 34 (that is, control of the intake air amount), and the like.

Figure 2:
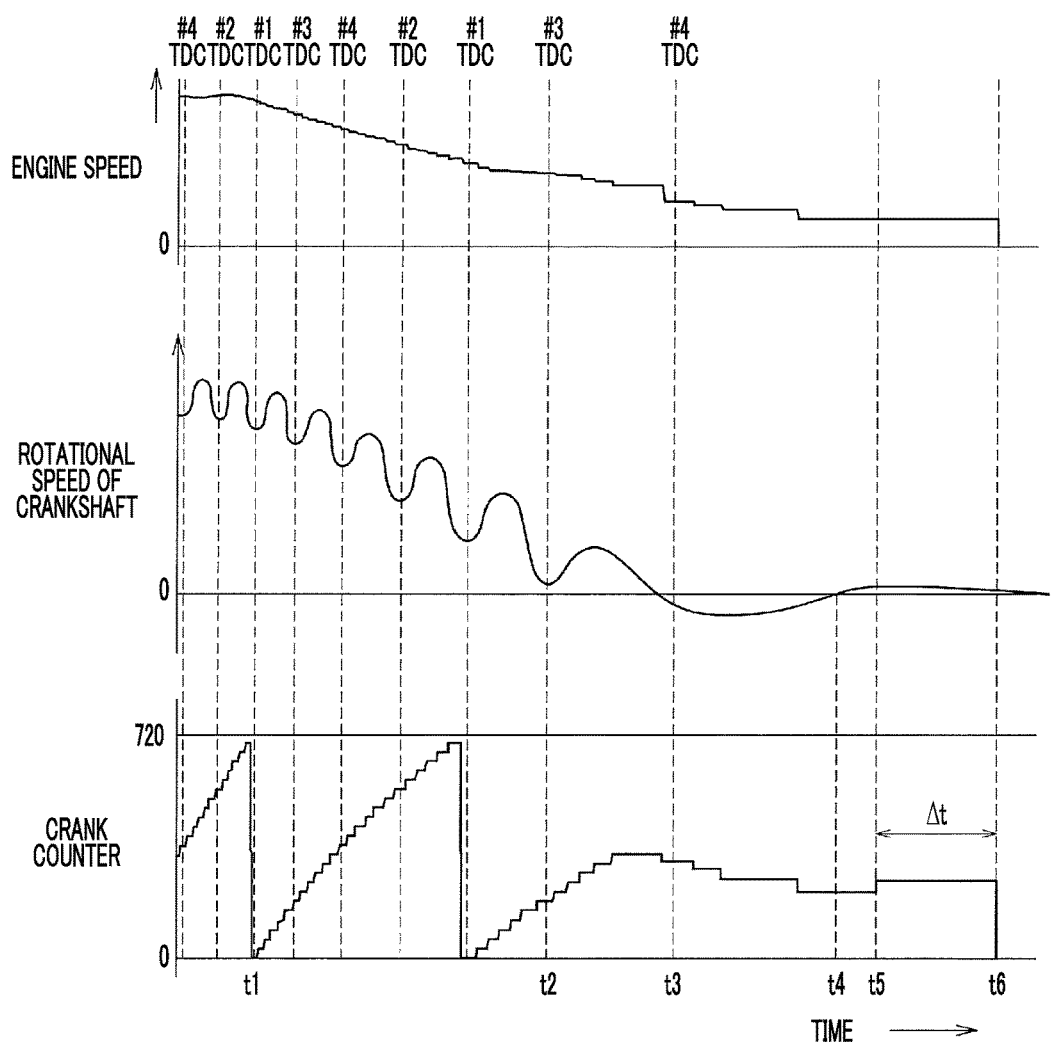
FIG. 2 is a timing chart of one example of changes in an engine speed, a rotational speed of a crankshaft, and a crank counter at a time of an engine stop.

Such fuel injection control and ignition control are executed at preferred timing in each of the cylinders 2. For this reason, a crank counter, one cycle of which corresponds to the two rotations of the crankshaft 13 (720° by the crank angle), is generated. As one example is shown in FIG. 2, the crank counter is generated with the top dead center of the first cylinder 2 (#1TDC) being a reference, for example. In addition, as shown in a lower section in FIG. 2, the crank counter is reset in response to input of the cam signal at time t1. Then, after a count value becomes zero (0), the crank counter is counted up in response to input of the crank signal.

When the starter motor SW 108 is operated to be ON, the ECU 100 operates the starter motor 18 to cause rotation of the crankshaft 13 (cranking), and executes the fuel injection control and the ignition control at a startup to start the engine 1. As will be described below, the ECU 100 also executes idling stop control, in which the ECU 100 automatically stops the engine 1 in a specified situation such as a stop of the vehicle and restarts the engine 1 thereafter without use of the starter motor 18 in response to a specified operation by an occupant.

Figure 3:
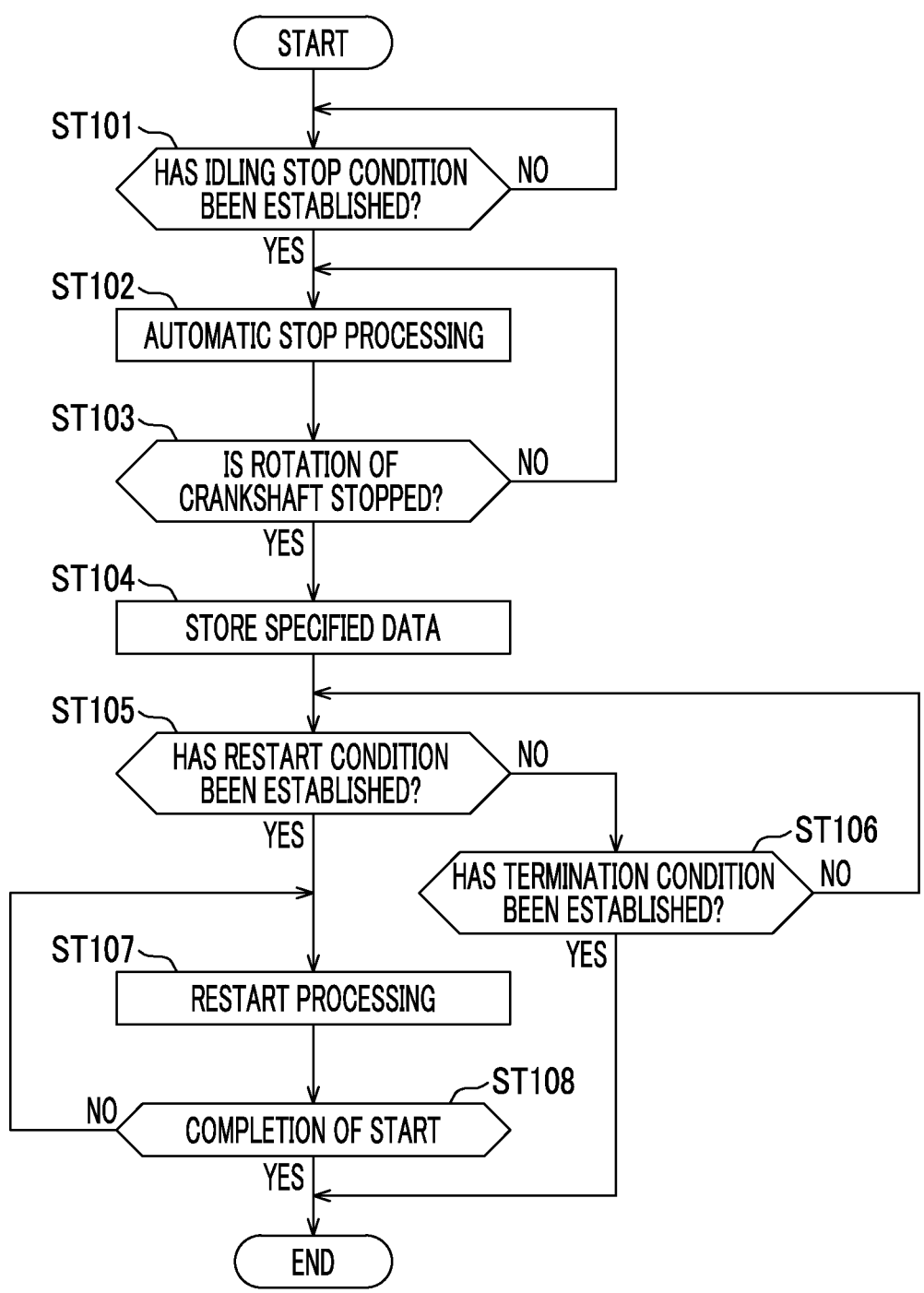
FIG. 3 is a flowchart of an idling stop control routine according to the embodiment.

—Idling Stop Control—FIG. 3 shows an overall processing flow of an idling stop control routine. This routine is repeatedly executed by the ECU 100 at specified timing. First, in step ST101, it is determined whether a specified idling stop condition has been established during an operation of the engine 1. If a negative determination is made (NO), the process returns. On the other hand, if a positive determination is made (YES), the process proceeds to step ST102, and automatic stop processing of the engine 1 is executed.

As one example of the idling stop condition, the condition may be set to include that the engine 1 is currently operated, that the accelerator is OFF (the accelerator operation amount is equal to or smaller than a specified threshold and is almost 0), that a brake is ON (a brake depression force is equal to or larger than a specified threshold), that the vehicle is in a stopped state (a vehicle speed is equal to or lower than a specified threshold and is almost 0), and the like.

When the fuel injection from the injector 19 and the ignition by the ignition plug 20 are stopped by the stop control in step ST102, as illustrated in FIG. 2, a rotational speed of the crankshaft 13 is gradually reduced. Thereafter, as will be described below in detail, it is determined whether the rotation of the crankshaft 13 is stopped (step ST103). If a negative determination (NO) is made, the process becomes idle. If a positive determination is made (YES), the process proceeds to step ST104, and specified data is stored in the backup RAM.

Thereafter, the ECU 100 stands by until a specified restart condition is established. More specifically, in step ST105, it is determined whether the restart condition of the engine 1 has been established. If a negative determination is made (NO), the process proceeds to step ST106. Then, it is determined whether a termination condition of the idling stop control, such as whether an ignition switch of the vehicle is turned off, has been established. If a positive determination is made (YES) for establishment of this condition, the routine is terminated (END).

On the other hand, if the termination condition of the idling stop control has not been established and thus a negative determination is made (NO), the process returns to step ST105. Then, if the restart condition has been established and a positive determination is thus made (YES), the process proceeds to step ST107, and restart processing of the engine 1 is executed. Note that the restart condition may be set to include, for example, that the depression force on the brake pedal is reduced and becomes smaller than the specified threshold, that an accelerator depressing operation is performed, that that a specified operation is performed on a shift lever, and the like.

While a detailed description will not be made on the restart processing, for example, the starter motor 18 is actuated to start cranking, the injector 19 starts injecting the fuel, and the ignition plug 20 starts igniting. Thereafter, the combustion is started (initial combustion) in any of the cylinders 2, which increases an engine speed to a specified value. Then, when it is determined that the start is completed (YES in step ST108), the routine is terminated (END).

—Engine Stop Determination—Next, a detailed description will be made on the determination of the rotation stop of the crankshaft 13 in step ST103 of the above flow. First, when the engine 1 is stopped, the engine speed is reduced as illustrated in an upper section of FIG. 2. At this time, as illustrated in a middle section of the same drawing, the overall rotational speed of the crankshaft 13 is also reduced. In addition, because an input interval of the crank signal is gradually extended, an inclination of a graph indicative of the crank counter gradually becomes gentle as illustrated in the lower section of the same drawing.

In the stop process of the engine 1, the rotation of the crankshaft 13 is decelerated as described above due to cylinder pressure that is increased in the compression stroke of each of the cylinders 2. Then, as the cylinder 2 approaches the top dead center (TDC), the rotational speed of the crankshaft 13 is reduced as illustrated in the middle section of the drawing. Meanwhile, when the cylinder 2 is shifted in the power stroke after passing the top dead center, the rotation of the crankshaft 13 is accelerated due to the cylinder pressure. Thus, the rotational speed thereof is increased.

In other words, the overall rotational speed of the crankshaft 13 is gradually reduced while a reduction and an increase thereof is repeated with the top dead center (#1TDC, #3TDC, #4TDC, . . . ) of each of the cylinders 2 being located therebetween. Inertia of the rotation is thereby reduced. In the illustrated example, after passing the top dead center of the third cylinder 2 (#3TDC) at time t2, the rotational speed of the crankshaft 13 cannot pass the top dead center of the fourth cylinder 2 (#4TDC) against the cylinder pressure thereof at time t3.

For this reason, after passing a swinging period, in which the crankshaft 13 momentarily is stopped immediately before the top dead center, is in the reverse operation, and is thereafter slightly operated in a positive rotation direction again, the crankshaft 13 is completely stopped. At this time, after the crankshaft 13 performs the reverse operation immediately before the time t3, the crank counter is reduced in response to the crank signal. Thereafter, after the crankshaft 13 is operated in the positive rotation direction again at time t4, the crank counter is increased at time t5.

When a turning angle of the crankshaft 13 is reduced from the swinging period to the complete stop, the crank angle sensor 101 no longer outputs the crank signal. Then, as in a period from the time t5 to time t6, when a period in which the crank signal is not received becomes a preset period Δt (at the time t6), it is determined that the rotation of the crankshaft 13 is stopped (that is, the engine 1 is completely stopped).

—Engine Restart Immediately Before Stop—By the way, there is a case where a driver releases the brake pedal, for example, and the restart condition is thereby established in the stop process of the engine 1 as described above (that is, immediately before the engine 1 is stopped). In this embodiment, at this time, the fuel injection and the ignition are executed in the cylinder 2 in the power stroke, and rotary power is provided to the crankshaft 13. In this way, the engine 1 is started (hereinafter also referred to as an ignition start) without the use of the starter motor 18.

For example, in the period from the time t1 to t2, which has been described above with reference to FIG. 2, the crankshaft 13 makes the positive rotation, and the inertia thereof is large to certain extent. In the case where the restart condition is established in this period, the fuel is injected by the injector 19 at a time when the third cylinder 2 in the compression stroke passes the top dead center (#3TDC) and is shifted in the power stroke. In this way, the air-fuel mixture is produced, and then is ignited by the ignition plug 20.

However, when the rotational speed of the crankshaft 13 becomes extremely low in the stop process of the engine 1 due to the small intake air flow in the cylinder 2, it is difficult to promote production of the air-fuel mixture. Accordingly, a misfire possibly occurs when the ignition plug 20 attempts to ignite the air-fuel mixture. Even when the ignition plug 20 ignites the air-fuel mixture, significant combustion pressure cannot be obtained, and the sufficient rotary power cannot be provided to the crankshaft 13. As a result, the start of the engine 1 possibly fails.

To handle this problem, in this embodiment, when the ignition start fails as described above, the failure is immediately determined. Then, the starter motor 18 is operated, so as to switch the engine start to a normal starter start associated with the cranking. A specific description will hereinafter be made on the ignition start and a procedure of the starter start as a backup, that is, a restart processing routine with reference to FIG. 4.

This routine is executed when the automatic stop processing (step ST102) of the engine 1, which has been described above with reference to FIG. 3, is executed and the rotational speed of the crankshaft 13 is reduced to be equal to or lower than a specified rotational speed. Note that the specified rotational speed corresponds to 200 to 300 rpm of the engine speed, for example, and is set in advance to eliminate a state where the inertia of the rotation of the crankshaft 13 is so large that the rotational speed thereof is expected to surely pass the next top dead center.

After the routine is started just as described, in step ST201, it is first determined whether the restart condition of the engine 1 has been established. This is the same as the restart condition (step ST105) in the idling stop control, which has been described above with reference to FIG. 3. If the restart condition has not been established and a negative determination is made (NO), the routine is terminated once (END). On the other hand, if the brake pedal is released, for example, thus the restart condition has been established, and a positive determination is made (YES), the process proceeds to step ST202. Then, it is determined whether the cylinder 2 in the compression stroke has passed the top dead center.

If a negative determination is made (NO), the process proceeds to step ST204, which will be described below. If a positive determination is made (YES), the process proceeds to step ST203, and the fuel injection and the ignition are executed for the ignition start. More specifically, the injector 19 of the cylinder 2, which has passed the top dead center and has been shifted in the power stroke, injects the fuel. Then, after a lapse of a first delay period, which is set in advance, the ignition plug 20 of said cylinder 2 is energized to ignite the air-fuel mixture.

On the other hand, in step ST204 after the negative determination (NO) in step ST202, it is determined whether the reverse operation of the crankshaft 13 has been performed, which has been described above with reference to FIG. 2, on the basis of the signal from the crank angle sensor 101. If a negative determination is made (NO), the process proceeds to step ST205, which will be described below. If a positive determination is made (YES), the process proceeds to step ST203, and the fuel injection and the ignition are executed for the ignition start.

More specifically, when the crankshaft 13 is in the reverse operation, the piston 12 of the cylinder 2 in the power stroke moves toward the top dead center, and the flow is rapidly damped. For this reason, in order to secure a time for producing the air-fuel mixture after the fuel injection by the injector 19 of the cylinder 2 in the power stroke, after a lapse of a longer second delay period than the first delay period, the ignition plug 20 of said cylinder 2 is energized to ignite the air-fuel mixture.

In step ST205 after the negative determination (NO) in step ST204, it is determined whether the operation of the crankshaft 13 has been stopped. If a negative determination is made (NO), the process returns to step ST202. On the other hand, if the specified time Δt has elapsed in a state where the crank signal is not input, for example, the crankshaft 13 has been stopped, and thus a positive determination is made (YES). Then, the process proceeds to step ST203, and the fuel injection and the ignition are executed for the ignition start.

If it is determined that the crankshaft 13 has been stopped, just as described, the flow becomes even smaller than that during the reverse operation. Accordingly, the injector 19 of the cylinder 2 in the power stroke injects the fuel. Then, after a lapse of a third delay period, which is even longer than the second delay period, the ignition plug 20 of said cylinder 2 is energized to ignite the air-fuel mixture.

After the fuel injection and the ignition for the ignition start are executed in accordance with a rotation state of the crankshaft 13 as described above, it is determined in step ST206 whether a specified standby time has elapsed. This standby time is set to eliminate an influence of noise, which is caused by the energization of the ignition plug 20 or the like. If a negative determination is made (NO), the ECU 100 stands by. If the standby time has elapsed and thus a positive determination is made (YES), the process proceeds to step ST207. Then, similar to step ST204, it is determined whether the reverse operation of the crankshaft 13 has been performed.

Figure 5:
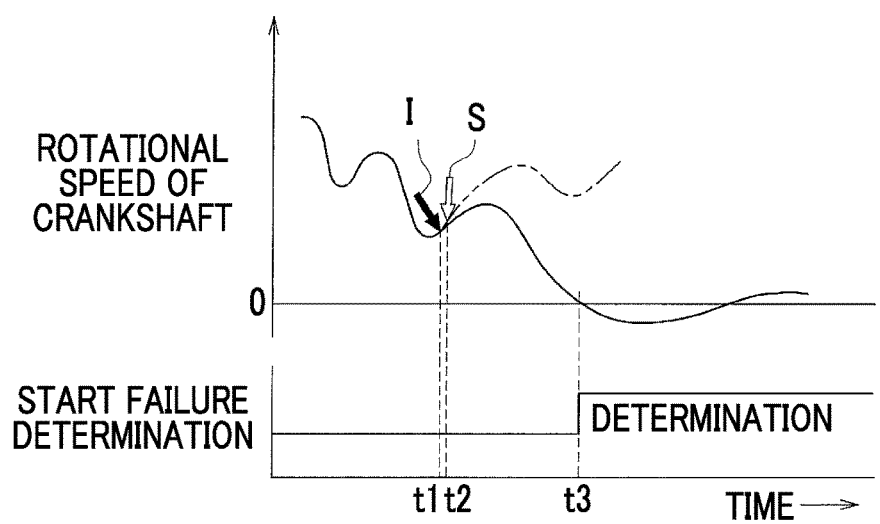
FIG. 5 is a timing chart of a change in a crank rotational speed in a case where a misfire occurs and start failure is determined after the restart processing is performed during positive rotation of the crankshaft.

More specifically, as schematically shown in FIG. 5, the fuel injection (indicated by an arrow I) and the ignition (indicated by an arrow S) are executed in the cylinder 2 in the power stroke (time t1, t2) during the positive rotation of the crankshaft 13 as in step ST202 to ST203, for example.

Even in such a case, the rotational speed of the crankshaft 13 is not increased unlike being illustrated by a phantom line in the same drawing. Then, after the rotational speed of the crankshaft 13 is reduced, the reverse operation of the crankshaft 13 is performed (time t3). In this way, failure of the ignition start can be determined.

Figure 6:
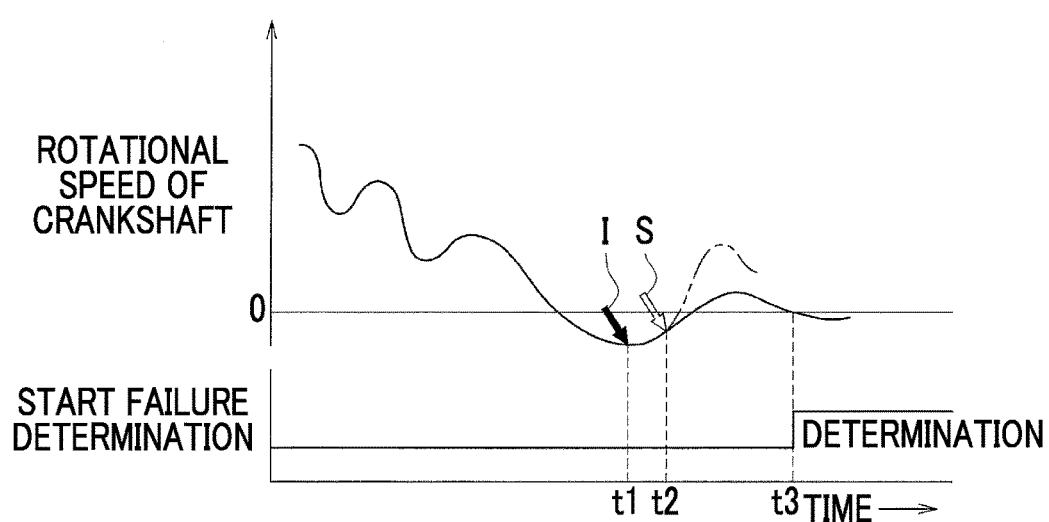
FIG. 6 corresponds to FIG. 5 and shows a case where the restart processing is performed during a reverse operation of the crankshaft.

In addition, as schematically shown in FIG. 6, as for the case where the fuel injection (the time t1) and the ignition (the time t2) are executed during the reverse operation of the crankshaft 13 in step ST204 to ST203, the rotational speed of the crankshaft 13 is not increased unlike being illustrated by a phantom line in the same drawing. Then, after the rotational speed of the crankshaft 13 is reduced, the reverse operation of the crankshaft 13 is performed (time t3). In this way, the failure of the ignition start can be determined.

For this reason, if a negative determination is made (NO) in step ST207, the process proceeds to step ST209, which will be described below. If a positive determination is made (YES), the process proceeds to step ST208. Then, the starter motor 18 is operated, and the fuel injection and the ignition are sequentially performed in the cylinders 2 in the compression stroke and the intake stroke. In this way, the engine start is switched to the so-called starter start, and then the routine is terminated once (END). Thereafter, the ECU 100 further executes processing including the fuel injection, the ignition, and the like in the cylinders 2 in the compression stroke and the intake stroke.

On the other hand, if the reverse operation of the crankshaft 13 is not performed and thus the negative determination is made (NO) in step ST207, the process proceeds to step ST209. Then, similar to step ST205, it is determined whether the operation of the crankshaft 13 has been stopped. If a negative determination is made (NO), the process proceeds to step ST210, which will be described below. On the other hand, if the crankshaft 13 has been stopped and thus a positive determination is made (YES), the process proceeds to step ST208, and the engine start is switched to the starter start.

Figure 7:
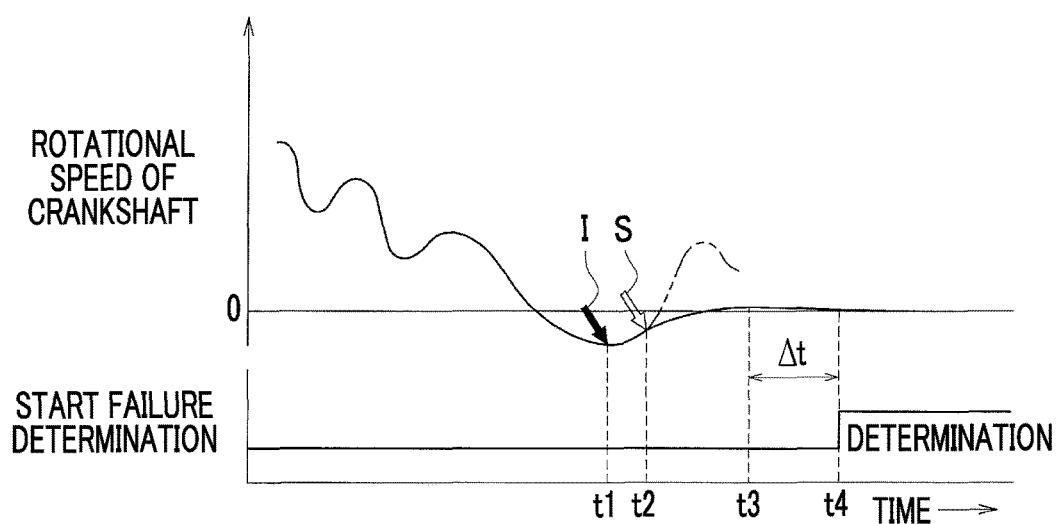
FIG. 7 corresponds to FIG. 6 and shows a case where the crankshaft is hardly operated reversely and is stopped.

A reason for the above is as follows: as schematically shown in FIG. 7, even when the fuel injection (time t1) and the ignition (time t2) are executed for the ignition start, the rotational speed of the crankshaft 13 is not increased unlike being illustrated by a phantom line in the same drawing. The reverse operation of the crankshaft 13 is hardly performed, and the crankshaft 13 is stopped. In this case, the turning angle of the crankshaft 13 by the reverse operation becomes extremely small, and thus the crank signal is no longer output.

For this reason, when the reverse operation is determined on the basis of the crank signal as described above, the stop of the crankshaft 13 is not recognized. As a result, the start failure cannot promptly be determined. Meanwhile, if the specified time Δt (t4–t3) has elapsed from time t3 to time t4 in FIG. 7, for example, in the state where the crank signal is not input, it is determined that the crankshaft 13 has been stopped. Thus, the start failure is determined, and the engine start is switched to the starter start.

Note that, after the operation of the crankshaft 13 has not been stopped and thus the negative determination is made (NO) in step ST208, the process proceeds to step ST210, and it is determined whether complete explosion of the engine 1 has been made as a determination on a normal start thereof. If a negative determination is made (NO), the process returns to step ST207. If a positive determination is made (YES), it is considered that the ignition start of the engine 1 has been succeeded. Thus, the routine is terminated (END).

Figure 4:
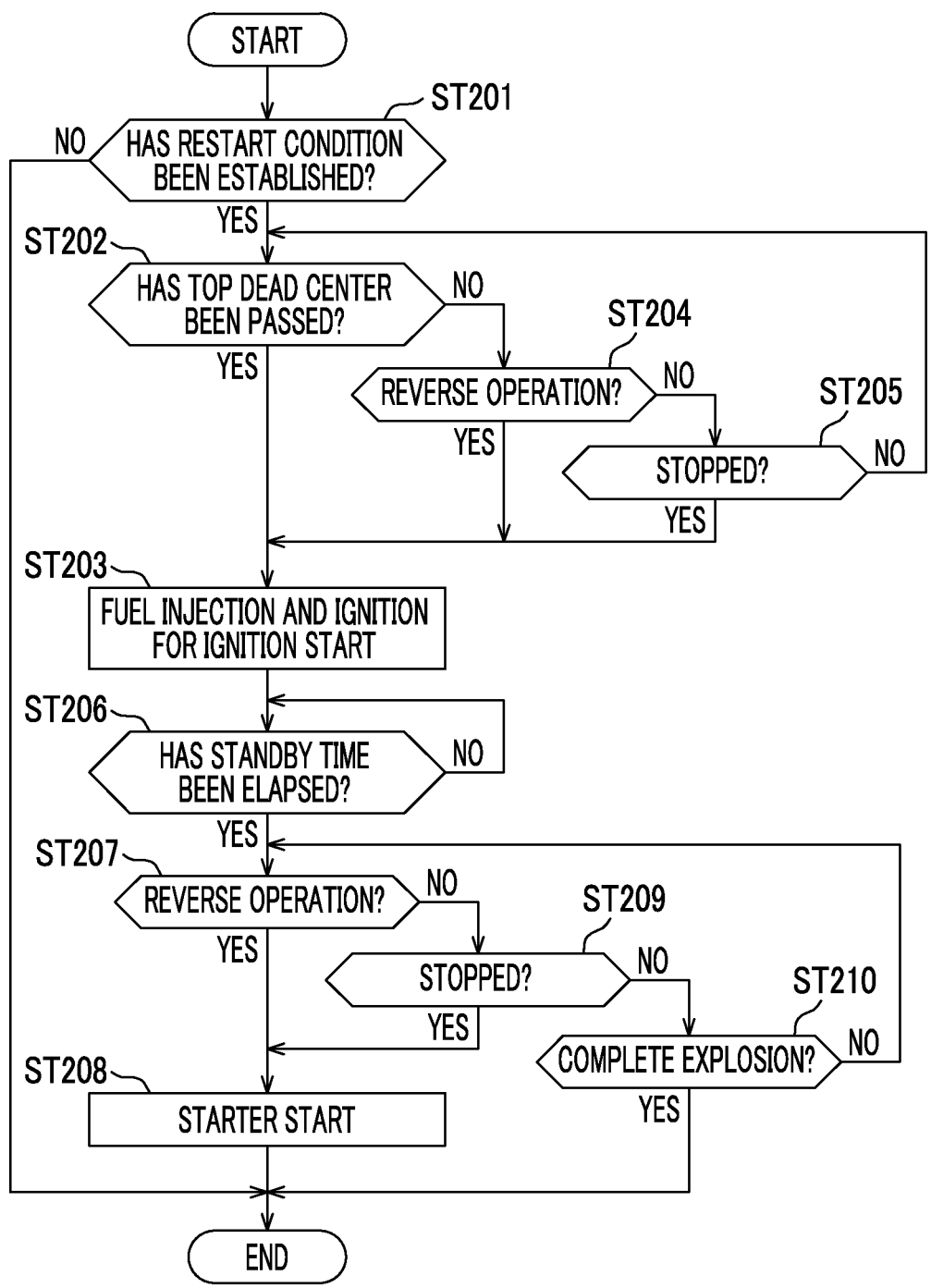
FIG. 4 is a flowchart of a procedure of restart processing according to the embodiment.

By performing step ST207 in the flow of FIG. 4, the ECU 100 constitutes determination means that determines the failure of the ignition start on the basis of the reverse operation of the crankshaft 13 after the fuel injection and the ignition in the cylinder 2 in the power stroke. In addition, by performing step ST209, the determination means determines the failure of the start when the rotation of the crankshaft 13 is stopped after the fuel injection and the ignition.

By performing step ST208, the ECU 100 operates the starter motor 18 when determining the failure of the ignition start through the determination on the reverse operation or the top of the crankshaft 13. Thereafter, the ECU 100 executes the fuel injection and the ignition of the cylinder 2 in the compression stroke to cause the starter start of the engine 1.

As it has been described so far, in this embodiment, when the restart condition is established in the process of stopping the engine 1, the fuel injection and the ignition are executed in the cylinder 2 in the power stroke. In this way, the restart (ignition start) can smoothly be achieved without the use of the starter motor 18. Even when this ignition start fails, this failure is promptly determined through the reverse operation of the crankshaft 13, and the engine start is immediately switched to the starter start. In this way, the driver is less likely to receive impression of the slow restart.

Furthermore, when the reverse operation of the crankshaft 13 is extremely small, the reverse operation is not recognized. Even in such a case, when it is determined thereafter that the rotation of the crankshaft 13 is substantially stopped (that is, when the crank signal is not input for the specified time Δt or longer), the start failure is determined, and the engine start is immediately switched to the starter start. In this case, although the driver receives the impression of the slow restart, the engine 1 can be started.

—Other Embodiments—The embodiment that has been described so far is merely illustrative and thus has no intention of limiting configurations, applications, and the like of the disclosure. For example, in the above embodiment, as illustrated in step ST207 of the flow in FIG. 4, when the reverse operation of the crankshaft 13 is performed after the fuel injection and the ignition for the ignition start, it is determined that the ignition start fails. In addition, in consideration of a possibility that the reverse operation is not recognized, it is determined in step ST209 that the ignition start fails even when the stop of the crankshaft 13 is determined. However, the disclosure is not limited thereto. The determination on the start failure on the basis of the stop of the crankshaft 13 may not be made.

In addition, in the above embodiment, the idling stop condition is set to include the vehicle stop state (the vehicle speed is equal to or lower than the specified threshold and is almost 0). However, the disclosure is not limited thereto. The disclosure can also be applied to a case where the engine 1 is automatically stopped and restarted during a travel of the vehicle.

Furthermore, in the above embodiment, the description has been made on the case where the disclosure is applied to the cylinder-injection type gasoline engine 1 that is mounted on the vehicle, and only the injector 19 for the cylinder injection is provided as the injector. However, the disclosure is not limited thereto. The disclosure can also be applied to an engine that also includes an injector for port injection. The disclosure is not limited to the gasoline engine, either. The disclosure can also be applied to an alcohol engine, a gas engine, or the like of the cylinder-injection type.

The disclosure can smoothly restart the cylinder-injection type engine without the use of the starter motor when the restart condition is established immediately before the engine stop. The disclosure exerts a remarkable effect when being applied to the engine mounted on an automobile, for example.

This embodiment may be defined as follows: a start controller for an engine, the engine including a plurality of cylinders and a crankshaft, and the engine being a cylinder-injection engine, the start controller includes: a starter motor; and an electronic control unit configured to execute fuel injection and ignition in a cylinder in an expansion stroke when a restart condition is established immediately before a stop of the engine, determine whether a reverse operation of the crankshaft has been performed after the fuel injection and the ignition in the cylinder in the expansion stroke, and operate the starter motor and execute the fuel injection and the ignition in the cylinder in a compression stroke to start the engine, when the electronic control unit determines that the reverse operation of the crankshaft has been performed. The electronic control unit may be configured to determine whether rotation of the crankshaft has been stopped after the fuel injection and the ignition in the cylinder in the expansion stroke are executed, and operate the starter motor and execute the fuel injection and the ignition in the cylinder in the compression stroke to start the engine, when the electronic control unit determines that the rotation of the crankshaft has been stopped.

What is claimed is:

1. A start controller for an engine, the engine including a plurality of cylinders and a crankshaft, and the engine being a cylinder-injection engine, the start controller comprising:
    a starter motor; and
    an electronic control unit configured to
        execute fuel injection and ignition in a cylinder in an expansion stroke when a restart condition is established immediately before a stop of the engine,
        determine whether a reverse operation of the crankshaft has been performed after the fuel injection and the ignition in the cylinder in the expansion stroke are executed, and
        operate the starter motor and execute the fuel injection and the ignition in a cylinder in a compression stroke to start the engine, when the electronic control unit determines that the reverse operation of the crankshaft has been performed.

2. The start controller according to claim 1, wherein the electronic control unit is configured to
    determine whether rotation of the crankshaft has been stopped after the fuel injection and the ignition in the cylinder in the expansion stroke are executed, and
    operate the starter motor and execute the fuel injection and the ignition in the cylinder in the compression stroke to start the engine, when the electronic control unit determines that the rotation of the crankshaft has been stopped.

* * * * *